United States Patent [19]
Croke et al.

[11] Patent Number: 5,857,725
[45] Date of Patent: Jan. 12, 1999

[54] SHADE ASSEMBLY MOUNT FOR VEHICLE COMPARTMENT

[75] Inventors: Joseph C. Croke, Macomb; Edward G. Curtindale, Farmington Hills, both of Mich.

[73] Assignee: UT Automotive Dearbon, Inc., Dearborn, Mich.

[21] Appl. No.: 679,617

[22] Filed: Jul. 10, 1996

[51] Int. Cl.$^6$ ............................................. B60R 5/04
[52] U.S. Cl. ................................. 246/37.16; 160/323.1
[58] Field of Search ................ 296/37.16; 160/23.1, 160/323.1, 324

[56] References Cited

U.S. PATENT DOCUMENTS

| | | |
|---|---|---|
| 3,279,529 | 10/1966 | Smith et al. . |
| 3,853,170 | 12/1974 | Barettella . |
| 4,139,231 | 2/1979 | Lang et al. . |
| 4,220,367 | 9/1980 | Gale et al. ............................ 296/37.16 |
| 4,480,675 | 11/1984 | Beremeier . |
| 4,668,001 | 5/1987 | Okumura et al. . |
| 4,781,234 | 11/1988 | Okumura et al. ..................... 296/37.16 |
| 4,932,704 | 6/1990 | Ament .................................... 296/37.16 |
| 5,083,601 | 1/1992 | Tedeschi ............................. 160/324 X |
| 5,224,748 | 7/1993 | Decker et al. . |
| 5,618,077 | 4/1997 | Ament et al. ......................... 296/37.16 |
| 5,676,416 | 10/1997 | Ament et al. ......................... 296/37.16 |

FOREIGN PATENT DOCUMENTS 3631488  7/1987  Germany .

*Primary Examiner*—Joseph D. Pape
*Attorney, Agent, or Firm*—Howard & Howard

[57] ABSTRACT

A shade assembly comprises a roller assembly and a pair of mounting brackets secured to opposed walls of a vehicle interior. The roller assembly includes a flexible cover, a roller, rotational biasing structure and first and second attachment members disposed at opposed ends of the roller assembly. The attachment members are attached to a corresponding mounting bracket. A first attachment member is releasably secured to the first bracket at a fixed point. The second mounting bracket supports the second attachment member at adjustable axial points. Thus, the shade assembly is able to accommodate various vehicle interior widths.

15 Claims, 2 Drawing Sheets

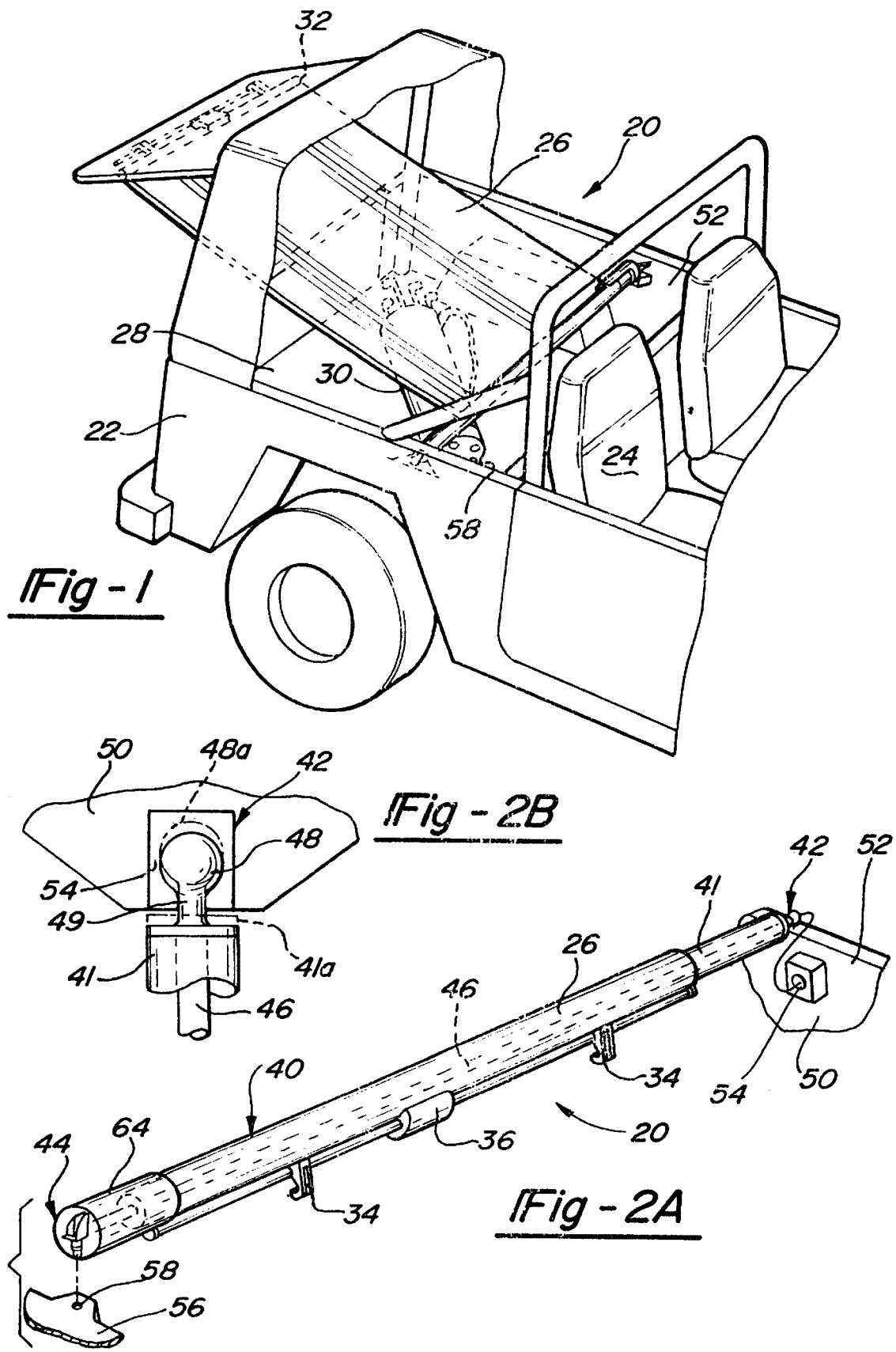

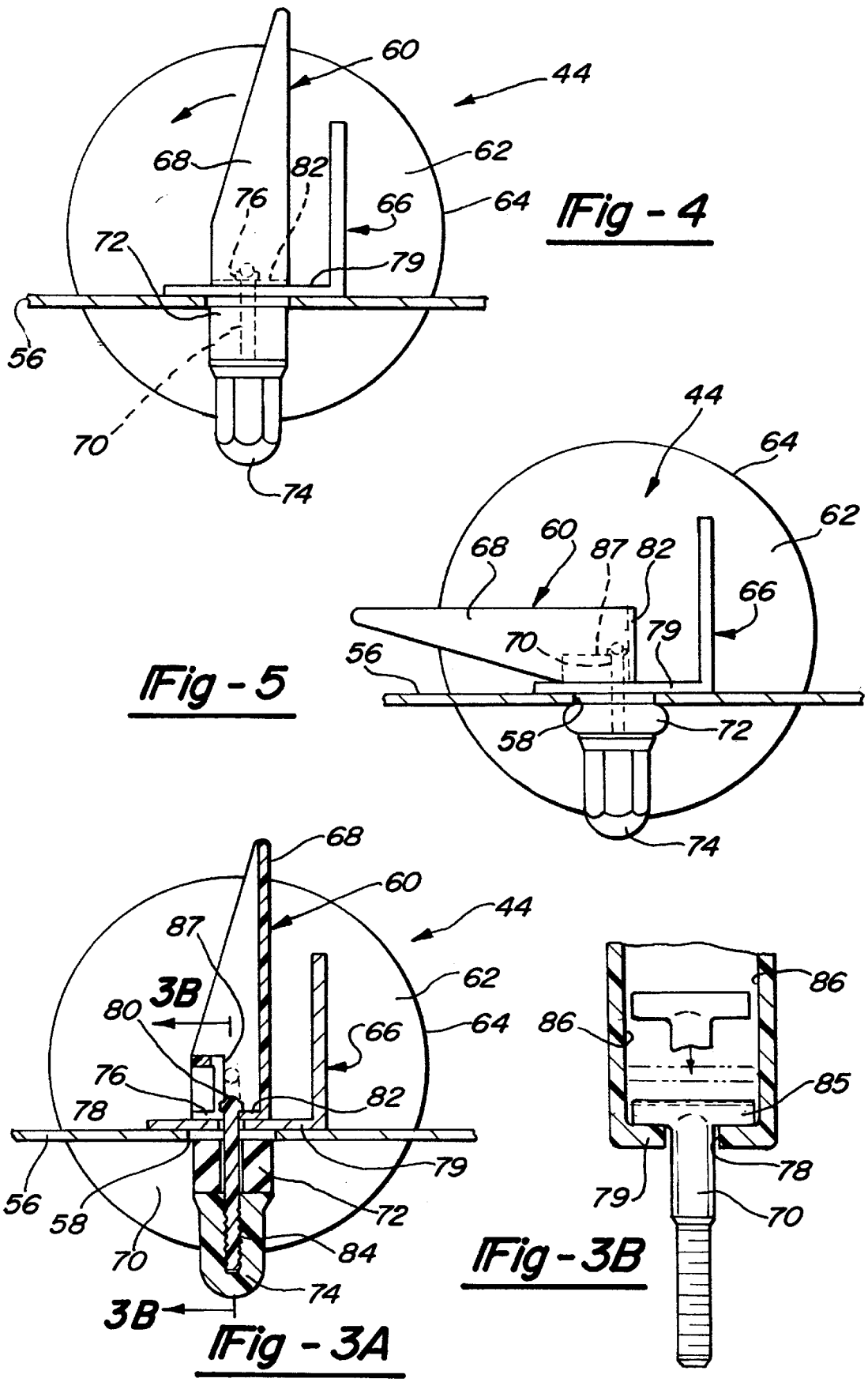

5,857,725

SHADE ASSEMBLY MOUNT FOR VEHICLE COMPARTMENT

BACKGROUND OF THE INVENTION

The present invention generally relates to a mount for shade assemblies that selectively covers a luggage compartment in a vehicle.

Vehicle compartment shade assemblies are used to cover a luggage compartment. A flexible cover is wrapped around a roller, and wound or unwound to selectively cover items located in the vehicle compartment.

A number of shade assemblies are disclosed in the known art. Generally, the shade assemblies are mounted onto a vehicle by securing opposed ends of the assembly to fixed mounting brackets disposed on interior walls of the vehicle compartment. One problem with known shade assemblies is that the width of the interior varies from vehicle to vehicle because of production variations. Thus, the lateral distance between the fixed mounting brackets varies. This can be a problem in the installation of a shade assembly. The known art has made attempts to address this problem.

In one prior example, spring-biased end members are disposed at opposed ends of the shade assembly. The end members are urged into contact with recesses in the fixed mounting brackets.

In another prior example, a shade assembly includes fixed end members disposed at opposed ends of the shade assembly. The end members are inserted into a mounting hole in a fixed mounting bracket. A small plate is disposed in the mounting hole and a spring biases the plate toward the end members.

Known spring loaded mounts have not been completely satisfactory. Thus, there is a need for a shade assembly for a vehicle compartment which accommodates the varying vehicle interior widths between individual vehicles.

SUMMARY OF THE INVENTION

A shade assembly of the present invention includes first and second attachment members disposed at opposed ends of the roller assembly. A first bracket is secured to a first wall of a vehicle interior and a second bracket is secured to a second wall of the vehicle interior. The first attachment member is releasably secured to the first bracket at a fixed point. The second bracket supports the second attachment member at varying points, depending on the width of the vehicle interior. The shade assembly is mounted by fixing the first attachment member in its bracket. The second attachment member adjusts within its bracket as necessary. Thus, the shade assembly is able to accommodate various vehicle interior widths.

In preferred features, the first attachment member comprises a compression latch assembly including a handle, a pin, an expandable rubber member and a cap. The rubber member is received on the pin between the handle and the cap. The cap is threadably received on a threaded end portion of the pin. The first bracket includes a hole having a diameter slightly larger than a relaxed outer diameter of the rubber member. The handle pulls the pin and end cap between locked and unlocked positions. In the locked position, the rubber member is compressed axially and expands radially outwardly to a greater diameter. In the unlocked position, the rubber member is allowed to axially expand to its relaxed position, and has a radially smaller outer diameter. The expanded radially greater size in the locked position is greater than the diameter of the hole. A lower portion of the latch assembly including the rubber member is moved through the bracket hole. When the compression latch assembly is moved to the locked position, the rubber member is expanded radially to its greater size and cannot move back through the hole. The compression latch assembly and the roller assembly are thereby securely attached to the first bracket.

The second bracket includes a socket defining a channel which receives the second attachment member. In a particularly preferred embodiment, the second attachment member is an enlarged ball member. The ball is received and supported in the channel at adjustable axial points. When the first attachment member is locked in the first bracket, the ball moves within the channel to a support position that accommodates the actual width of the vehicle.

These and other features of the present invention will be best understood from the following specification and drawings, of which the following is a brief description.

BRIEF DESCRIPTION OF THE DRAWINGS

FIG. 1 is a perspective view of a vehicle having a shade assembly of the present invention with the cover in an extended position.

FIG. 2A is a perspective view of a shade assembly in accordance with the present invention.

FIG. 2B is a top plan view of one end member of the shade assembly of FIG. 2A positioned in a mounting bracket.

FIG. 3A is a cross-sectional view of another end member in the shade assembly of FIG. 2A.

FIG. 3B is a partial view of the structure shown in FIG. 3A.

FIG. 4 is a side elevation view of an end member of the shade assembly of FIG. 2A shown in an unlocked position.

FIG. 5 is a side elevation view of an end member of the shade assembly of FIG. 2A in a locked position.

DETAILED DESCRIPTION OF A PREFERRED EMBODIMENT OF THE INVENTION

As shown in FIG. 1, a shade assembly 20 is typically mounted adjacent a rear vehicle portion 22 and behind rear seat 24. Shade assembly 20 may be conventional and includes a flexible cover 26 which is extended across a luggage compartment 28 in a rear portion of vehicle 22 to hide items 30 from view.

In FIG. 2A, cover 26 is shown with hook 34 to attach cover 26 to door 32. Cover free end 36 may also include a handle 38 to facilitate the extension and retraction of cover 26. Although a front to rear shade is shown, cross car embodiments may also come within the scope of this invention.

Shade assembly 20 comprises a roller assembly 40. Flexible cover 26 is mounted on a roller 41 and a rotational biasing structure is adapted to wind cover 26 onto roller 41. The rotational biasing structure may be of the type known in the art and forms no part of the present invention.

Shade assembly 20 includes attachment members 42 and 44 disposed at opposed ends of a rod 46. Roller 41 is mounted for rotation on rod 46 to extend or retract cover 26 in a known manner.

As shown in FIG. 2B, attachment member 42 comprises an enlarged ball 48 extending from a smaller neck 49. Attachment member 42 is mounted to a vehicle interior 28 at mounting bracket 50. Bracket 50 may be securely affixed to a lateral interior panel 52 of the vehicle 22. In an alternative embodiment, bracket 50 is integral with interior panel 52. Bracket 50 has a socket 54 which is a cylindrical horizontal shape to receive ball 48. The socket 54 is of sufficient length such that the ball 48 can be supported at varying locations to accomodate dimensional variance of the parts and vehicle build and maintain engagement. As shown, enlarged member 48 can move inwardly or outwardly of socket 54. The ball is shown in phantom at 48A and in solid line at 48 to illustrate this movement. At all times, ball 48 is supported in socket 54.

As shown in FIG. 2A, attachment member 44 is to be attached to a mounting bracket 56. Mounting bracket 56 is secured to a lateral interior panel opposed to panel 52. Alternatively, bracket 56 may be integral with the interior panel. The distance between interior panels 52 and 58 varies due to production tolerances. Thus, the distances between brackets 50 and 56 may vary slightly. Shade assembly 20 is able to accommodate such production tolerances and allow simple mounting of the shade assembly 20 in a vehicle interior, as described below. Mounting bracket 56 has a hole 58 for mounting attachment member 44 to bracket 56.

FIG. 3A shows attachment member 44 resting on bracket 56 in an unlocked configuration. Hole 58 defines a fixed mounting point for the attachment member 44. Attachment member 44 comprises a compression latch 60 which is disposed at an outer lateral face 62 of an end cap 64 fixed to an end of shade assembly 20. An L-shaped bracket 66 extends from lateral face 62 of end cap 64. Latch 60 includes a handle 68, a pin 70, an expandable rubber grommet 72 and a cap 74. Pin 70 passes through a hole 76 in a lower portion 82 of handle 60 and a hole 78 disposed in a horizontal lower portion 79 of bracket 66. An enlarged T-shaped end 80 of pin 70 prevents pin 70 from passing through hole 78. Enlarged end 80 abuts an upper face of lower portion 82. Grommet 72 is cylindrical in shape and comprises a material which may be compressed and later return to its relaxed original shape. Rubber is a preferred material for grommet 72. Grommet 72 is received on pin 70 between portion 79 of bracket 66 and cap 74. Cap 74 is threadably received onto a threaded portion 84 of pin 70 thereby retaining grommet 72 on pin 70. As shown in FIG. 3B enlarged T-shaped end 80 of pin 70 includes tabs 85 received in side channels 86 in handle 60. A side face 87 partially defines channels 86.

As shown in FIG. 4, latch 60 is mounted on bracket 56 by inserting the lower portion of latch 60 through hole 58. Thus, grommet 72 and cap 74 are positioned in hole 58 in mounting bracket 56. The diameter of hole 58 is larger than the outer diameter of grommet 72 in this relaxed, unlocked, position. To securely attach attachment member 44 to bracket 56, latch 60 is moved to a locked position by pivoting handle 68 through 90°.

As shown in FIG. 5 with this movement, pin 70 is raised away from bracket 66. Essentially, the pin is cammed in the movement between FIGS. 4 and 5 by the side face 87. In the FIG. 4 position, pin 70 is biased downwardly such that it is only spaced above bracket 79 by the thin lower portion 82 of the bracket 66. When the handle 60 is moved to the locked position as shown in FIG. 5, the tabs 85 are cammed upwardly by the side face 87 such that they are now spaced above the surface 79 by the entire distance between the front of the handle 68 and bracket 79. As shown in FIG. 5, this is significantly higher than the position shown in FIG. 4. This upward movement compresses the rubber grommet 72 between portion 79 of bracket 66 and cap 74. This causes grommet 72 to expand radially outwardly to have a diameter larger than the size of hole 58. Grommet 72 can thus no longer be pulled out of hole 58, and latch 60 is securely attached to mounting bracket 56.

Shade assembly 20 is able to accommodate various vehicle interior widths. Attachment member 42 is first mounted in mounting bracket 50 by placing ball 48 in socket 54. As shown in FIG. 2B, ball 48 is able to move within socket 54 between various axial positions. Ball 48a (shown in phantom) illustrates one axial position while the solid line ball 48 illustrates another.

Attachment member 44 is then releasably secured to mounting bracket 56 at a fixed point. Compression latch 60 is attached to mounting bracket 56 by being inserted into hole 58 in the unlocked position. Attachment member 42 adjusts within socket 54 to accommodate vehicles having various interior widths. The latch 60 is then moved to its locked position. At that time, for vehicles having narrower interior widths, ball 48 will be disposed further into socket 54 such as illustrated by ball position 48a. In vehicles having a wider vehicle interior width, ball 48 will be disposed in socket 54 at a position such as 48.

The latch 60 may be of a known type available from Southco Company and commonly known as a Southco latch.

A preferred description of this invention has been disclosed; however, a worker of ordinary skill in the art would recognize that certain modifications would come within the scope of this invention. For that reason, the following claims should be studied to determine the true scope and content of this invention.

We claim:

1. A shade assembly for a vehicle compartment comprising:

a roller assembly including a flexible cover, and a roller, said cover wound on said roller, and a first and second attachment member disposed at opposed ends of said roller assembly;

a first bracket to be secured to a first wall of a vehicle interior;

a second bracket to be secured to a second wall of the vehicle interior; and said first attachment member being releasably secured to said first bracket at a fixed point, said first attachment member being releasably locked to said first bracket such that said first attachment member cannot be removed from said first bracket without releasing said lock, and said second bracket supporting said second attachment member at varying positions depending on the width of the vehicle interior, thereby accommodating various vehicle interior widths; and said first attachment member includes an expandable member that has a first smaller size in an unlocked position, and a second larger size in a locked position;

said first bracket including a hole having an inner size larger than said first smaller size of said expandable member, said second larger size being greater than the size of said hole, such that said expandable member is secured in said hole in said locked position.

2. A shade assembly as recited in claim 1, wherein said second attachment member comprises a member movable within a socket to support the roller assembly.

3. A shade assembly as recited in claim 1, wherein said first attachment member comprises a compression latch assembly including a handle, a pin and a cap, said expandable member received on said pin between said handle and said cap, said cap fixed on an end portion of said pin, said handle pulling said pin and said cap to compress said expandable member to its second size in said locked position and allowing said expandable member to expand to its first size in said unlocked position.

4. A shade assembly as recited in claim 3, wherein said second bracket includes a socket defining an axial channel which receives and supports said second attachment member at an infinite number of positions.

5. A shade assembly as recited in claim 4, wherein said second attachment member includes an enlarged member, said socket receiving and supporting said enlarged member for supporting said roller assembly.

6. A shade assembly as recited in claim 1, wherein said expandable member is generally cylindrical, and said first and second sizes are diameters.

7. A shade assembly for a vehicle compartment comprising:
- a roller assembly including a flexible cover and a roller, said cover wound on said roller, and first and second attachment members disposed at opposed ends of said roller assembly;
- a first bracket to be secured to a first wall of a vehicle interior, and a second bracket to be secured to a second wall of the vehicle interior;
- said first attachment member including an expandable member positioned in a hole in said first bracket that has a first smaller size in an unlocked position and a second larger size in a locked position, said hole having a size larger than said smaller size of said expandable member, said second larger size being greater than the size of said hole, such that said expandable member is secured in said hole in said locked position; and
- said second attachment member including an enlarged member extending from said roller assembly, and said second bracket including a socket defining an axial channel which receives said enlarged member, to support the roller assembly.

8. A shade assembly as recited in claim 7, wherein said first attachment member comprises a compression latch assembly including a handle, a pin and a cap, said expandable member received on said pin between said handle and said cap, said cap fixed on an end portion of said pin, said handle being movable between locked and unlocked positions, and pulling said pin and cap to compress said expandable member in said locked position, and allowing said expandable member to expand to said smaller size in said unlocked position.

9. A shade assembly as recited in claim 8, wherein said handle includes a central hole, said pin having tabs preventing said pin from moving through said hole, such that said pin is received in said handle, said handle pivoting by 90° between said locked and unlocked positions to pull said pin towards said handle and compress said expandable member.

10. A shade assembly as recited in claim 9, wherein said expandable member having a central hole such that said pin can pass through said expandable member.

11. A shade assembly as recited in claim 7, wherein said expandable member comprises a generally cylindrical rubber member.

12. A shade assembly for a vehicle compartment comprising:
- a roller assembly including a flexible cover and a roller, said cover wound on said roller, and first and second attachment members disposed at opposed ends of said roller assembly;
- said first attachment member including an expandable member having a first smaller size in an unlocked position and a second larger size in a locked position, said second larger size being greater than the size of an opening in a bracket which is to secure said first attachment member such that said expandable member is secured in the bracket in said locked position; and
- said second attachment member including a member extending from said roller assembly, said member being adapted to be supported in a socket in a second bracket at an infinite number of positions.

13. A shade assembly as recited in claim 12, wherein said first expandable member is a generally cylindrical rubber grommet, and said first and second sizes are diameters.

14. A shade assembly as recited in claim 12, wherein said first attachment member comprises a compression latch assembly including a handle, a pin and a cap, said expandable member received on said pin between said handle and said cap, said cap fixed on an end of said pin, said handle being moveable between locked and unlocked positions and pulling said pin and said cap to compress an expandable member in said locked position, and allowing said expandable member to expand to said smaller size in said unlocked position.

15. A shade assembly as recited in claim 14, wherein said handle includes a central hole, said pin having tabs preventing said pin from moving through said hole, such that said pin is received in said handle portion, said handle portion pivoting by 90° between said locked and unlocked positions to pull said pin toward said handle and compress an expandable member.

\* \* \* \* \*